(12) United States Patent
Wang et al.

(10) Patent No.: US 11,475,093 B2
(45) Date of Patent: Oct. 18, 2022

(54) METHOD AND APPARATUS FOR PROCESSING WEBPAGE, DEVICE, AND STORAGE MEDIUM

(71) Applicant: BAIDU ONLINE NETWORK TECHNOLOGY (BEIJING) CO., LTD., Beijing (CN)

(72) Inventors: Qun Wang, Beijing (CN); Penghe Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 166 days.

(21) Appl. No.: 17/019,835

(22) Filed: Sep. 14, 2020

(65) Prior Publication Data

US 2021/0192004 A1 Jun. 24, 2021

(30) Foreign Application Priority Data

Nov. 22, 2019 (CN) .......................... 201911157827.2

(51) Int. Cl.
  *G06N 3/04* (2006.01)
  *H04L 41/5041* (2022.01)
  *G06F 16/957* (2019.01)

(52) U.S. Cl.
  CPC ...... *G06F 16/9574* (2019.01); *G06F 16/9577* (2019.01); *G06N 3/04* (2013.01); *H04L 41/5041* (2013.01)

(58) Field of Classification Search
  CPC ............. G06F 16/9574; G06F 16/9577; G06F 16/986; G06N 3/04; H04L 41/5041;
  (Continued)

(56) References Cited

U.S. PATENT DOCUMENTS 6,243,761 B1 * 6/2001 Mogul .................. H04L 69/329
  709/219
8,396,310 B1 * 3/2013 Kadambe ............. G06K 9/6244
  375/240.18
(Continued)

FOREIGN PATENT DOCUMENTS

CN   102591877 A   7/2012
CN   103838771 A   6/2014
(Continued)

OTHER PUBLICATIONS

Extended European Search Report for corresponding European Patent Application 20196412.9, dated Feb. 23, 2021.

*Primary Examiner* — Stephen S Hong
*Assistant Examiner* — Ahamed I Nazar
(74) *Attorney, Agent, or Firm* — Harnes, Dickey & Pierce, P.L.C.

(57) ABSTRACT

The present application provides a method and an apparatus for processing webpage, a device and storage medium, involving the terminal vision technology. The specific implementation is: when a server determines that a current network meets a preset condition and a webpage to be displayed includes an image required to be displayed, the server sends a static data resource corresponding to the image required to be displayed to the terminal. The preset condition includes at least one of the following: the current network being a mobile network, a bandwidth of the current network being less than a preset bandwidth, and a rate of the current network being less than a preset rate. Therefore, it is unnecessary to send a static data resource corresponding to an image not required to be displayed to the terminal, thereby reducing a traffic consumption and at the meanwhile, improving an integrity and coherence of the webpage.

16 Claims, 6 Drawing Sheets

(58) Field of Classification Search
CPC . H04L 65/4084; H04L 67/2828; H04L 67/32; H04L 67/02; H04W 48/18; H04W 84/12; H04W 88/06; H04W 4/18; H04W 24/10
See application file for complete search history.

(56) References Cited

U.S. PATENT DOCUMENTS

| | | |
|---|---|---|
| 2012/0089581 A1 | 4/2012 | Gupta et al. |
| 2012/0114248 A1* | 5/2012 | Yang .................. G06F 16/5838 382/190 |
| 2012/0192080 A1* | 7/2012 | Lloyd .................... H04L 67/60 715/744 |
| 2013/0097488 A1* | 4/2013 | Coman ............... G06F 16/9577 715/243 |
| 2018/0137544 A1 | 5/2018 | Thomas et al. |

FOREIGN PATENT DOCUMENTS

| | | |
|---|---|---|
| CN | 105512278 A | 4/2016 |
| CN | 108268578 A | 7/2018 |
| WO | 2007/099544 A2 | 9/2007 |
| WO | 2007/099544 A3 | 3/2011 |

* cited by examiner

METHOD AND APPARATUS FOR PROCESSING WEBPAGE, DEVICE, AND STORAGE MEDIUM

CROSS-REFERENCE TO RELATED APPLICATIONS

This application claims priority to Chinese Patent Application No. 201911157827.2, filed on Nov. 22, 2019, which is hereby incorporated by reference in its entirety.

TECHNICAL FIELD

The present application relates to the field of communication technologies, and in particular, to a terminal vision technology.

BACKGROUND

With the development of Internet technology, people like to obtain information quickly on the webpage. The network content which is full of various information flows contains a lot of high-traffic resources such as images, which will cause a large amount of traffic consumption.

Currently, in order to save network traffic for a user, a server determines whether the terminal is in a wireless fidelity (Wi-Fi) network. If it is, the server enables the terminal to download the corresponding hypertext markup language (HTML) and a static data resource of the webpage normally; while in the mobile network, the server makes it impossible for the terminal to download the static data resource corresponding to all images on the webpage, thus making it impossible for the terminal to display the images on the webpage, which affects an integrity and coherence of the webpage.

SUMMARY

The present application provides a method and an apparatus for processing webpage, a device and storage medium, which reduces traffic consumption and at the meanwhile, improves an integrity and coherence of a webpage.

Embodiments of the present application provide a method for processing webpage, including: receiving a webpage request message sent by a terminal, where the webpage request message includes an address of a webpage to be displayed and indication information, the indication information is used to indicate whether a current network accessed by the terminal meets a preset condition, and the preset condition includes at least one of the following: the current network being a mobile network, a bandwidth of the current network being less than a preset bandwidth, and a rate of the current network being less than a preset rate;

sending, when it is determined that the current network meets the preset condition according to the indication information and that the webpage to be displayed comprises an image required to be displayed according to the address, a static data resource corresponding to the image to the terminal, so that the terminal is render-able to, according to the static data resource and a target hypertext markup language (HTML) of the webpage to be displayed, the webpage to be displayed so as to display the webpage to be displayed.

That is, when the server determines that the current network meets the preset condition, and determines that the webpage to be displayed includes an image required to be displayed, the server sends the static data resource corresponding to the image required to be displayed, and a static data resource corresponding to an image not required to be displayed is unnecessary to be sent to the terminal, thereby reducing the traffic consumption and at the meanwhile, improving an integrity and coherence of the webpage.

In some embodiments, before the sending, when it is determined that the current network meets the preset condition according to the indication information and that the webpage to be displayed comprises an image required to be displayed according to the address, a static data resource corresponding to the image required to be displayed to the terminal, the method further includes: taking the webpage to be displayed as input of a neural network model to determine the image required to be displayed; in some embodiments, determining resolutions of all images on the webpage to be displayed, and determining the image with a resolution less than a preset resolution as the image required to be displayed; and in some embodiments, determining a preset image in each image on the webpage to be displayed; and determining the preset image as the image required to be displayed. That is, the above three options can be used to determine the image required to be displayed by the terminal when the current network meets the preset condition. In contrast, other images on the webpage are images that are not required to be displayed. As such, the server only sends the static data resource corresponding to the image required to be displayed to the terminal, and does not send the static data resource corresponding to the image not required to be displayed, thereby reducing the traffic consumption and at the meanwhile, improving an integrity and coherence of the webpage.

In some embodiments, the method further includes: annotating the image required to be displayed and/or annotating the image not required to be displayed on the webpage to be displayed to obtain annotation information, thereby making the server identify the image required to be displayed and/or the image not required to be displayed.

In some embodiments, the method further includes: sending the annotation information and an initial HTML of the webpage to be displayed to the terminal, so that the terminal modify, according to the annotation information, a sparse representation classification (SRC) of the image not required to be displayed in the initial HTML to be null, or modify the SRC of the image not required to be displayed to a default image SRC of the terminal, to obtain the target HTML. As such, even if the terminal receives the static data resource corresponding to the image not required to be displayed, the terminal is not required to load the static data resource into the target HTML, thereby reducing a power consumption of the terminal.

In some embodiments, the method further includes: when it is determined that the current network meets the preset condition according to the indication information and that the webpage to be displayed comprises an image required to be displayed according to the address, obtaining, the initial HTML of the webpage to be displayed, modifying a sparse representation classification (SRC) of the image not required to be displayed in the initial HTML to be null, or modifying the SRC of the image not required to be displayed to a default image SRC of the terminal, to obtain the target HTML; and sending the target HTML to the terminal. As such, on one hand, when the SRC of the image not required to be displayed in the initial HTML is modified to be null, the target HTML is smaller than the initial HTML, thereby achieving saving traffic. On the other hand, even if the terminal receives the static data resource corresponding to the image not required to be displayed, the terminal is not necessary to load the static data resource into the target HTML, thereby reducing a power consumption of the terminal.

An apparatus for processing webpage, a device, storage medium, and a program product on the server side, and a method and an apparatus for processing webpage, a device, storage medium, and a program product on the terminal side will be provided below, and the effect thereof may refer to the corresponding effect of the method for processing webpage on the server side as above, which will not be repeated below.

In a second aspect, the present application provides a method for processing webpage, including: sending a webpage request message to a server, where the webpage request message includes an address of a webpage to be displayed and indication information, the indication information is used to indicate whether a current network accessed by a terminal meets a preset condition, and the preset condition includes at least one of the following: the current network being a mobile network, a bandwidth of the current network being less than a preset bandwidth, and a rate of the current network being less than a preset rate; receiving a static data resource that corresponds to an image required to be displayed on the webpage to be displayed and is sent by the server; and rendering, according to the static data resource and a target hypertext markup language (HTML) of the webpage to be displayed, the webpage to be displayed so as to display the webpage to be displayed.

In some embodiments, before the rendering, according to the static data resource and a target HTML of the webpage to be displayed, the webpage to be displayed so as to display the webpage to be displayed, the method further includes: receiving annotation information sent by the server and an initial HTML of the webpage to be displayed, where the indication information is used to indicate the image required to be displayed on the webpage to be displayed and/or the image not required to be displayed; when the current network meeting the preset condition, modifying, according to the annotation information, a sparse representation classification (SRC) of the image not required to be displayed to be null, or modifying the SRC of the image not required to be displayed to a default image SRC of the terminal, to obtain the target HTML. In some embodiments, the target HTML is obtained by the server, modifying the sparse representation classification (SRC) of the image not required to be displayed in the initial HTML of the webpage to be displayed to be null, or modifying the SRC of the image not required to be displayed to a default image SRC of the terminal.

In a third aspect, the present application provides an apparatus for processing webpage, and the apparatus is part or entire of a server, including: a receiving module, a determining module and a sending module. The receiving module is configured to receive a webpage request message sent by a terminal, where the webpage request message includes an address of a webpage to be displayed and indication information, the indication information is used to indicate whether a current network accessed by the terminal meets a preset condition, and the preset condition includes at least one of the following: the current network being a mobile network, a bandwidth of the current network being less than a preset bandwidth, and a rate of the current network being less than a preset rate; the determining module is configured to determine whether the current network meets the preset conditions according to the indication information and determine whether the webpage to be displayed includes an image required to be displayed according to the address; and the sending module is configured to send, when it is determined that the current network meets the preset condition according to the indication information and that the webpage to be displayed comprises an image required to be displayed according to the address, a static data resource corresponding to the image to the terminal, so that the terminal is render-able to, according to the static data resource and the HTML of the webpage to be displayed, the webpage to be displayed so as to display the webpage to be displayed.

In a fourth aspect, the present application provides an apparatus for processing webpage, and the apparatus is part or entire of a terminal, including:

a sending module, configured to send a webpage request message to a server, where the webpage request message includes an address of a webpage to be displayed and indication information, the indication information is used to indicate whether a current network accessed by a terminal meets a preset condition, and the preset condition includes at least one of the following: the current network being a mobile network, a bandwidth of the current network being less than a preset bandwidth, and a rate of the current network being less than a preset rate;

a receiving module, configured to receive a static data resource that is sent by the server and corresponds to the image required to be displayed; and a display module, configured to render, according to the static data resource and a target hypertext markup language (HTML) of the webpage to be displayed, the webpage to be displayed, so as to display the webpage to be displayed.

In a fifth aspect, the present application provides an electronic device, including:

at least one processor, and a memory in communication with the at least one processor; where the memory stores instructions executable by the at least one processor, and the instructions are executed by the at least one processor to execute the method according to the first aspect or to any one of the optional forms of the first aspect.

In a sixth aspect, the present application provides an electronic device, including:

at least one processor, and a memory in communication with the at least one processor; where the memory stores instructions executable by the at least one processor, and the instructions are executed by the at least one processor to execute the method according to the second aspect or to any one of the optional forms of the second aspect.

In a seventh aspect, the present application provides a computer-readable non-transitory storage medium with computer instructions stored thereon, wherein the computer instructions are configured to cause a computer to execute the method according to the first aspect or to any one of the optional forms of the first aspect.

In an eighth aspect, the present application provides a computer-readable non-transitory storage medium with computer instructions stored thereon, wherein the computer instructions are configured to cause a computer to execute the method according to the second aspect or to any one of the optional forms of the second aspect.

In a ninth aspect, the present application provides a computer program product, including computer instructions, and the computer instructions are configured to cause a computer to execute the method according to the first aspect or to any one of the optional forms of the first aspect.

In a tenth aspect, the present application provides a computer program product, including computer instructions, and the computer instructions are configured to cause a computer to execute the method according to the first aspect or to any one of the optional forms of the first aspect.

Embodiments of the above application has the following advantages or beneficial effects: reducing the traffic consumption and at the meanwhile, improving an integrity and coherence of the webpage. Since such technical solution is used, that the server sends a static data resource corresponding to the image required to be displayed to the terminal, and does not need to send the static data resource corresponding to the image not required to be displayed, the technical problem of un-integrity and incoherence of an webpage has been overcome and the technical effect of improving an integrity and coherence of the webpage is achieved.

Other effects of the above optional forms will be illustrated below in combination with specific embodiments.

BRIEF DESCRIPTION OF THE DRAWINGS

The accompanying drawings are intended for a better understanding of this solution and do not limit the present application.

DESCRIPTION OF EMBODIMENTS

The following illustrates exemplary embodiments of the present application in combination with exemplary embodiments of the present application are described below with reference to the accompanying drawings, which include various details of the embodiments of the present application to facilitate understanding, and they should be considered as merely exemplary. Therefore, those of ordinary skill in the art should be aware that various changes and modifications may be made to the embodiments described herein without departing from the scope and spirit of the present application. Also, the description of functions and structures in the common knowledge are omitted in the following description for clarity and brevity.

As described above, at present, in order to save network traffic for a user, a server determines whether a terminal is in a Wi-Fi network; when the terminal is in the Wi-Fi network, the server allows the terminal to download HTML and static data resources corresponding to the webpage normally, while when the terminal is in a mobile network, the server prevents the terminal from downloading the static data resources corresponding to all the images on the webpage, which results in that the terminal cannot display images on the webpage, and affects the integrity and coherence of the webpage in turn.

However, some tabular images or custom images and the like on the webpage are indispensable parts, where the so-called custom images refer to some custom advertising images. In order to achieve the coherence and integrity of the webpage when the user browses the webpage, it is not allowed to simply hide these tabular images or custom images directly in the network hierarchical display. As such, the present application provides a method and an apparatus for processing webpage, a device and storage medium. The main idea of the present application is: the server determines whether the current network accessed by the terminal meets a preset condition, and determines whether to allow the terminal to download the static data resource corresponding to each image on the webpage to be displayed, so that the terminal can intelligently display the webpage. The above preset condition may include at least one of the following: the current network being a mobile network, a bandwidth of the current network being less than a preset bandwidth, and a rate of the current network being less than a preset rate, but is not limited thereto. The static data resource used in the present application are also known as a static resource, which refer to the data acquired from the memory by the server after the terminal sends the webpage request message to the server, and the data is used by the terminal to render the webpage to be displayed.

Figure 1:
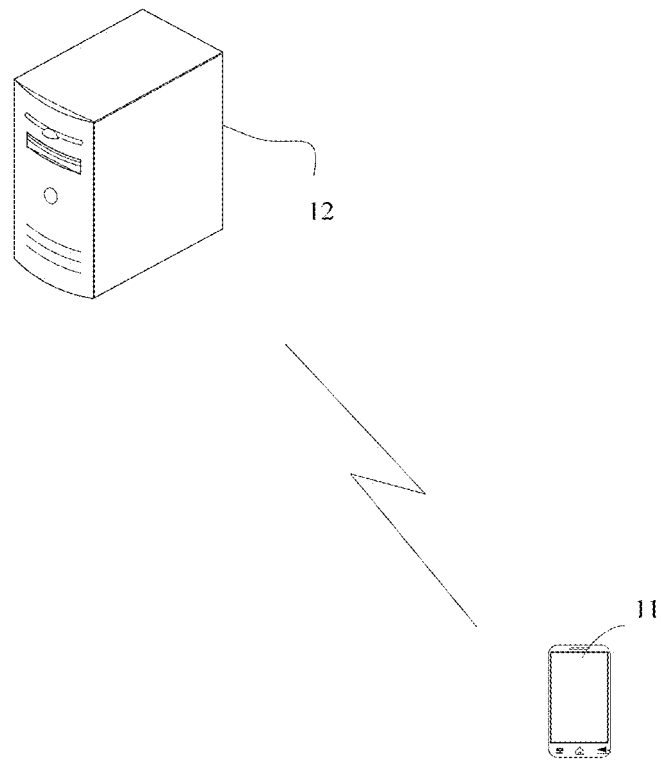
FIG. 1 is an application scenario diagram according to an embodiment of the present application.

An application scenario of the present application may be as the following, but are not limited thereto: FIG. 1 is an application scenario diagram according to an embodiment of the present application, in which a terminal 11 may be wirelessly connected to one or more servers 12. In the FIG. 1, the connection between the terminal 11 and one server 12 is taken as an example, in which the current network accessed by the terminal 11 may be a Wi-Fi network or a mobile network, the terminal 11 is installed with a web browser thereon, and the user may enter the address of the webpage to be displayed in an address bar of the web browser, or may click a link in the web browser to display the webpage to be displayed.

The terminal device referred to in this application may be a device that provides voice and/or data connectivity to a user, a handheld device with a wireless connection function, or other processing devices connected to a wireless modem. The terminal device may communicate with at least one core network via a radio access network (RAN). The terminal device may be a mobile terminal, such as a mobile phone (also called a "cellular" phone) and a computer with a mobile terminal which, for example, may be portable, pocket, handheld, computer-built or in-vehicle mobile apparatuses, which exchange voice and/or data with the RAN. The terminal device may also be called a subscriber unit, a subscriber station, a mobile station, a remote station, an access point, a remote terminal, an access terminal, a user terminal, a user agent or a user equipment, which are not limited herein.

Figure 2:
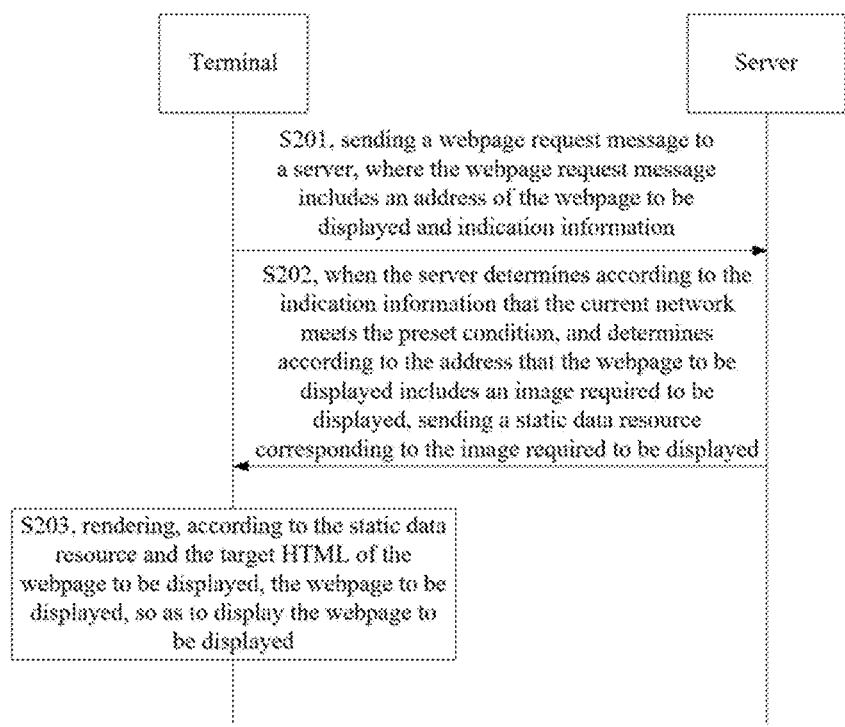
FIG. 2 is a flowchart of a method for processing webpage according to an embodiment of the present application.

The technical solution of the present application is described in detail in the following:

FIG. 2 is a flowchart of a method for processing webpage according to an embodiment of the present application, and the execution entity of this method may be part or entire of a terminal and part or entire of a server, where the part of the terminal may be a processor in the terminal, and the part of the server may be a processor in the server. The following illustrates this embodiment with the execution entity as the terminal and server, as shown in FIG. 2, the method for processing webpage includes:

Step S201, the terminal sends a webpage request message to a server, where the webpage request message includes an address of the webpage to be displayed and indication information.

Where a way for the terminal to send the webpage request message to the server may be: a web browser is installed on the terminal, when the user enters the address of the webpage to be displayed in an address bar of the web browser and presses "Enter", the terminal is triggered to send a webpage request message to the server. In some implementations, when the user clicks a link in a web browser, the terminal is triggered to send a webpage request message to the server.

The address of the webpage to be displayed as aforementioned refers to a uniform resource locator (URL) address of the webpage to be displayed. The above indication information is used to indicate whether the current network accessed by the terminal meets a preset condition, and the preset condition includes at least one of the following: the current network being a mobile network, a bandwidth of the current network being less than a preset bandwidth, and a rate of the current network being less than a preset rate. The preset bandwidth and the preset rate may be set as required, which is not limited in the present application. For example, when the indication information indicates that the current network accessed by the terminal is a mobile webpage, it means that the preset condition is met. In some implementations, when the indication information indicates that the bandwidth of the current network is less than the preset bandwidth, it means that the preset condition is met. In some implementations, when the indication information indicates that the rate of the current network is less than the preset rate, it means that the preset condition is met.

Step S202, when the server determines according to the indication information that the current network meets the preset condition and determines according to the address that the webpage to be displayed includes an image that is required to be displayed, the server sends a static data resource corresponding to the image required to be displayed.

The server acquires the HTML of the webpage to be displayed, and determines each image on the page according to tags in the HTML, such as an img tag, so as to establish a correspondence between the webpage to be displayed and each image on the webpage. The server is capable of establishing the correspondence between the webpage to be displayed and each image on the webpage. For example, the address of the webpage to be displayed is:

http://baijiahao.baidu.com/ s?id=1647084098322953056&hidebar=1, based on which, an address of an image on the webpage may be generated as:

{"http://baijiahao.baidu.com/ s?id=1647084098322953056&hidebar=1": [http://f11. baidu.com/it/u=3676927738, 2301821650&fm=173&app=49&f=JPEG?w=640&h= 434&s=7E 3A2FC30A1778DC8A94005B030050D0&access= 215967316,http://f10.baidu.com/it/u=2551 652409, 13124222&fm=173&app=49&f=JPEG?w=631&h= 829&s=0EAA7623158FC1EB58 FD04DA0000C0B1&access=215967316]}, which is an address in a demo format, and the format of an image address is not limited to such demo format in the present application.

The server may also determines, by using a neural network model or other determination conditions, the image required to be displayed and/or the image not required to be displayed which are included on the webpage to be displayed, and annotates the image required to be displayed and/or annotates the image not required to be displayed, so as to obtain an annotation information. For example, the annotation information is as following: {the address of the webpage to be displayed: [image 1: not displayed when the current network meets the preset condition, image 2: not displayed when the current network meets the preset condition, image 3: displayed when the current network meets the preset condition]}. When the server determines according to the indication information that the current network meets the preset condition, the server first obtains the webpage to be displayed through the address of the webpage to be displayed, and checks, according to the annotation information, whether the webpage to be displayed includes an image required to be displayed and/or an image not required to be displayed. For example, the server may determine according to the above annotation information that both image 1 and image 2 are not required to be displayed, and that image 3 is required to be displayed. Further, the server sends a static data resource corresponding to the image required to be displayed to the terminal, but does not send a static data resource corresponding to the image not required to be displayed to the terminal. For example, with reference to the above annotation information, the server first sends a static data resource corresponding to image 3 to the terminal, but does not send the static data resources corresponding to image 1 and image 2.

It should be noted that if the server determines according to the indication information that the current network does not meet the preset condition, for example, when the current network is a Wi-Fi network, the server sends the static data resources corresponding to both the image required to be displayed and the image not required to be displayed to the terminal. When the server determines according to the indication information that the current network meets the preset condition, but the webpage to be displayed does not include an image required to be displayed, the server does not send the static data resource corresponding to any one of the images.

Step S203, the terminal renders, according to the static data resource and the target HTML of the webpage to be displayed, the webpage to be displayed, so as to display the webpage to be displayed.

Before displaying the webpage to be displayed, the terminal needs to download the webpage to be displayed. The so-called downloading the webpage to be displayed refers to downloading both the HTML and the static data resource of the webpage to be displayed. In step S203, assuming that the terminal has finished downloading the HTML of the webpage to be displayed, the terminal renders, according to the static data resource and the target HTML of the webpage to be displayed, the webpage to be displayed, so as to display the webpage to be displayed. The terminal may use a webview to render the webpage.

Figure 3:
FIG. 3 is a schematic diagram of a webpage to be displayed according to an embodiment of the present application.

FIG. 3 is a schematic diagram of a webpage to be displayed according to an embodiment of the present application, where when the current network of the terminal meets the preset condition, both image 1 and image 2 which are not required to be displayed, are displayed as crosses, and image 3 which is required to be displayed, is displayed by the terminal normally. The rest part of text on the page to be displayed may still be displayed normally.

In summary, the present application provides a method for processing webpage, when the server determines that the current network meets the preset condition, and determines that the webpage to be displayed includes an image that is required to be displayed, the server sends the static data resource corresponding to the image required to be displayed to the terminal, and does not need to send the static data resource corresponding to the image not required to be displayed, to the terminal, thereby reducing the traffic consumption and at the meanwhile, improving the integrity and coherence of the webpage.

As aforementioned, the server may also determines, by using a neural network model or other determination conditions, the image required to be displayed and/or the image not required to be displayed included on the webpage to be displayed, and before step S202, the following options may be used to determine the image required to be displayed and/or the image not required to be displayed:

Option I: the server takes a webpage to be displayed as input of a neural network model to determine the image required to be displayed when the current network meets the preset condition.

In which, the server may train the neural network model through a large number of webpage samples. The input of the neural network model is a webpage, and the output thereof is an image required to be displayed on the webpage.

Of course, the images to be displayed on the webpage may also be selected, through manual intervention, on the server.

Option II: the server determines resolutions of all images on the webpage to be displayed, and determines the image with a resolution less than a preset resolution as the image required to be displayed.

The higher the resolution of the image is, the more transmission resources are needed and the greater the network traffic consumption is caused. Therefore, a preset resolution may be set in advance. When an image has a resolution less than the preset resolution, the server sends the static data resource corresponding thereto to the terminal, that is, the terminal is able to display the image. Otherwise, the server does not send the static data resource corresponding thereto to the terminal, that is, the terminal is not able to display the image.

In which, the preset resolution may be set according to practical needs, and developers may modify the preset resolution, which is not limited in the present application.

Option III: the server determines a preset image in each image on the webpage to be displayed; and determines the preset image as the image required to be displayed.

The preset image may be a tabular image or a custom image as described above. When the server determines an image as a preset image, which is determined by the server as the image required to be displayed. The preset image may be stored locally on the server or in the cloud, which is not limited in the present application.

In summary, in the present application, the server may take a webpage to be displayed as input of a neural network model to determine the image required to be displayed; in some implementations, determine resolutions of all images on the webpage to be displayed, and determine the image with a resolution less than the preset resolution as the image required to be displayed; and in some implementations, determine a preset image in each image on the webpage to be displayed, and determine the preset image as the image required to be displayed. That is, the above three options may be used to determine the image required to be displayed by the terminal when the current network meets the preset condition. In contrast, other images on the webpage are images that are not required to be displayed. As such, the server only sends the static data resource corresponding to the image required to be displayed to the terminal, and does not send the static data resource corresponding to the image not required to be displayed, to the terminal, thereby reducing the traffic consumption and at the meanwhile, improving the integrity and coherence of the webpage.

As described above, the so-called downloading the webpage to be displayed refers to downloading both the HTML and a static data resource of the webpage to be displayed. When the current network meets the preset condition, and the webpage to be displayed includes an image required to be displayed, the server sends the static data resource corresponding to the image required to be displayed to the terminal, and does not send the static data resource corresponding to the image not required to be displayed, to the terminal. How to download the HTML of the webpage to be displayed is illustrated below.

Figure 4:
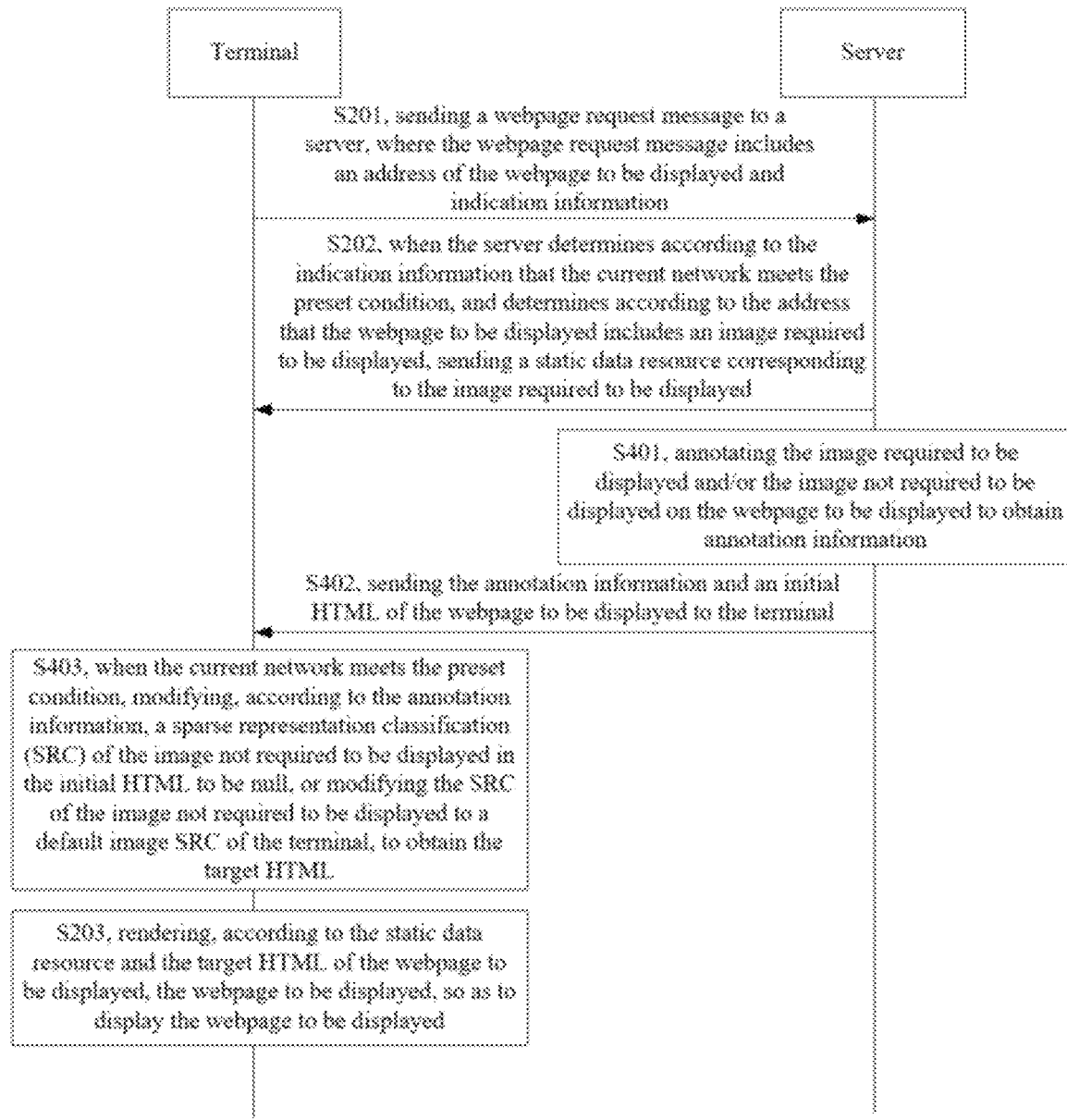
FIG. 4 is a flowchart of a method for processing webpage according to another embodiment of the present application.

Option I: FIG. 4 is a flowchart of a method for processing webpage according to another embodiment of the present application. Before step S203, the method for processing webpage further includes:

Step S401, the server annotates the image required to be displayed and/or the image not required to be displayed on the webpage to be displayed to obtain annotation information.

Step S402, the server sends the annotation information and an initial HTML of the webpage to be displayed to the terminal.

Step S403, when the current network meets the preset condition, the terminal modifies, according to the annotation information, a sparse representation classification (SRC) of the image not required to be displayed in the initial HTML to be null, or modifies the SRC of the image not required to be displayed to a default image SRC of the terminal, to obtain the target HTML.

As described above, the server may determines, by using a neural network model or other determination conditions, the image required to be displayed and/or the image not required to be displayed included on the webpage to be displayed, and annotates the image required to be displayed and/or the image not required to be displayed, so as to obtain the annotation information. For example, the annotation information is as following: {address of the webpage to be displayed: [image 1: not displayed when the current network meets the preset condition, image 2: not displayed when the current network meets the preset condition, image 3: displayed when the current network meets the preset condition]}.

Further, the server sends the annotation information and the initial HTML of the webpage to be displayed to the terminal. The initial HTML is an original HTML of the webpage to be displayed, that is, no changes have been made to the HTML. When the terminal determines that the current network meets the present conditions, the terminal may modify, according to the annotation information, the sparse representation based classification (SRC) of the image not required to be displayed in the initial HTML to be null, or modify the SRC of the image not required to be displayed to a default image SRC of the terminal, to obtain the target HTML. That is, to modify the SRC of the image not required to be displayed in the initial HTML to be null, or to modify the SRC of the image not required to be displayed to a default image SRC of the terminal. As such, even if the terminal receives the static data resource corresponding to the image not required to be displayed, the terminal is not required to load the static data resource corresponding thereto into the target HTML, thereby reducing the power consumption of the terminal.

In some implementations, the Steps S401 to S403 may also be executed before step S202, or before the server sends the static data resource corresponding to the image required to be displayed to the terminal, and the terminal may send the target HTML to the server, so as to trigger the server to send the static data resource corresponding to the image required to be displayed, but not to send the static data resource corresponding to the image not required to be displayed, thereby reducing the traffic consumption and at the meanwhile, improving the integrity and coherence of the webpage.

Figure 5:
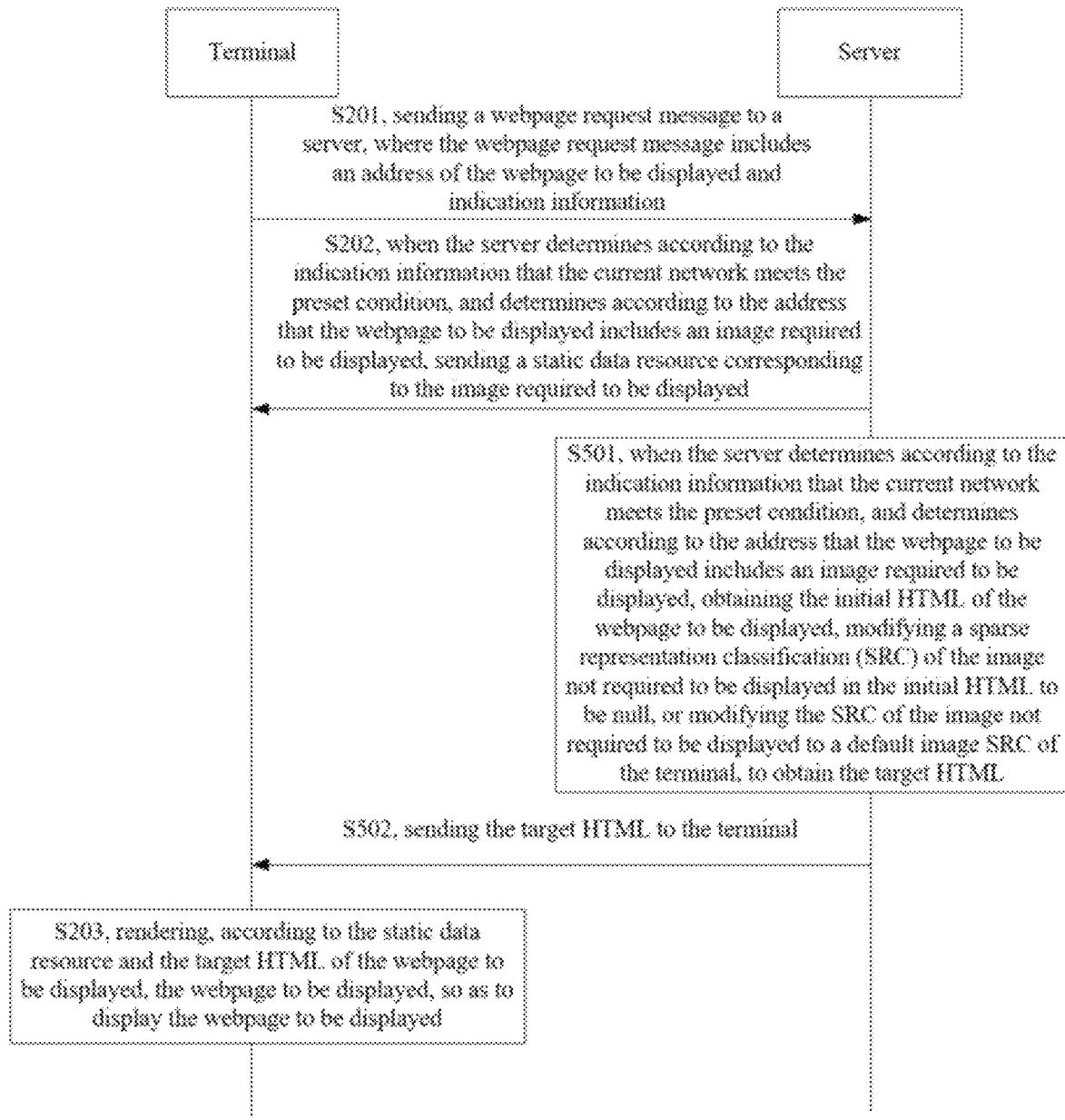
FIG. 5 is a flowchart of a method for processing webpage according to a further embodiment of the present application.

Option II: FIG. 5 is a flowchart of a method for processing webpage according to a further embodiment of the present application. Before step S203, the method for processing webpage further includes:

Step S501, when the server determines according to the indication information that the current network meets the preset condition, and determines according to the address that the webpage to be displayed includes an image required to be displayed, the server obtains the initial HTML of the webpage to be displayed and modifies a sparse representation classification (SRC) of the image not required to be displayed in the initial HTML to be null, or modifies the SRC of the image not required to be displayed to a default image SRC of the terminal, to obtain the target HTML.

Step S502, the server sends the target HTML to the terminal.

In which, step S501 may trigger the server to send a static data resource corresponding to the image required to be displayed, but not to send the static data resource corresponding to the image not required to be displayed, to the terminal. Of course, Step S501 may also be independent from sending the static data resource corresponding to the image required to be displayed, but not sending the static data resource corresponding to the image not required to be displayed, to the terminal, which is not limited in the present application.

When the server determines according to the indication information that the current network meets the preset condition and determines according to the address that the webpage to be displayed includes an image required to be displayed, the server may modify, according to the annotation information, the SRC of the image not required to be displayed in the initial HTML to be null, or modify the SRC of the image not required to be displayed to a default image SRC of the terminal, to obtain the target HTML. As such, on one hand, when the SRC of the image not required to be displayed in the initial HTML is modified to be null, the target HTML is smaller than the initial HTML, thereby saving traffic. On the other hand, when the terminal receives the static data resource corresponding to the image not required to be displayed, the terminal is not required to load the static data resource into the target HTML, thereby reducing the power consumption of the terminal.

Figure 6:
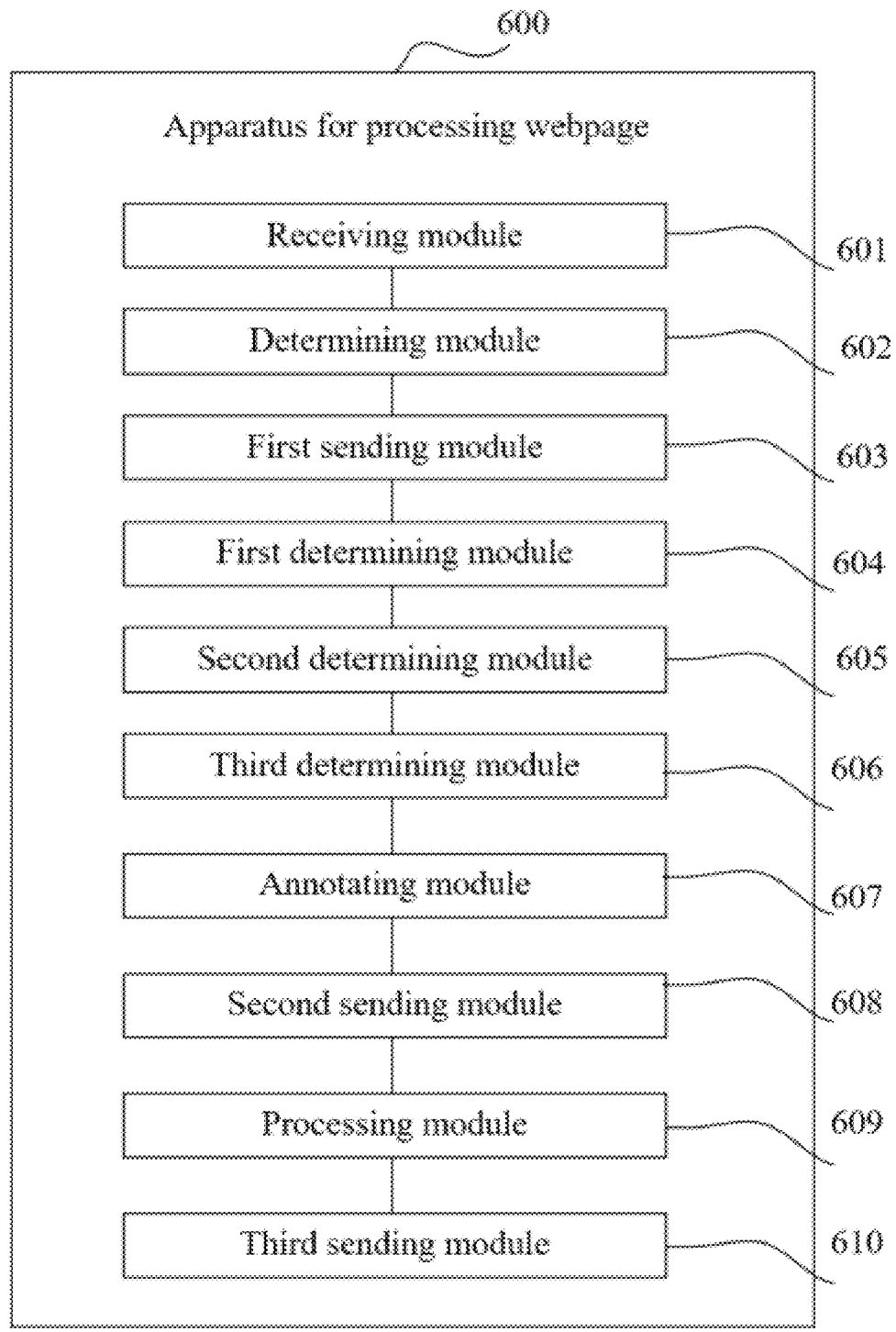
FIG. 6 is a schematic diagram of an apparatus for processing webpage 600 according to an embodiment of the present application.

FIG. 6 is a schematic diagram of an apparatus for processing webpage 600 according to an embodiment of the present application. As shown in FIG. 6, the apparatus 600 is part or entire of the server, and the apparatus 600 includes: a receiving module 601, a determining module 602 and a first sending module 603.

The receiving module 601 is configured to receive a webpage request message sent by a terminal, where the webpage request message includes an address of a webpage to be displayed and indication information, the indication information is used to indicate whether a current network accessed by the terminal meets a preset condition, and the preset condition includes at least one of the following: the current network being a mobile network, a bandwidth of the current network being less than a preset bandwidth, and a rate of the current network being less than a preset rate.

The determining module 602 is configured to determine according to the indication information whether the current network meets the preset condition and determine according to the address whether the webpage to be displayed includes an image required to be displayed.

The sending module 603 is configured to send, when the determining module 602 determines according to the indication information that the current network meets the preset condition and determines according to the address that the webpage to be displayed includes the image required to be displayed, a static data resource corresponding to the image required to be displayed to the terminal, so that the terminal is render-able to, according to the static data resource and a hypertext markup language (HTML) of the webpage to be displayed, the webpage to be displayed so as to display the webpage to be displayed.

In some implementations, the apparatus 600 further includes a first determining module 604, configured to, before that the determining module 602 determines according to the indication information whether the current network meets the preset condition and determines according to the address whether the webpage to be displayed includes an image required to be displayed, and the first sending module 603 sends the static data resource corresponding to the image to the terminal, take the webpage to be displayed as input of a neural network model to determine the image required to be displayed.

In some implementations, the apparatus 600 further includes a second determining module 605, configured to determine, before that the determining module 602 determines according to the indication information whether the current network meets the preset condition and determines according to the address whether the webpage to be displayed includes an image required to be displayed, and the first sending module 603 sends the static data resource corresponding to the image to the terminal, resolutions of all images on the webpage to be displayed and determine an image with a resolution less than the preset resolution as the image required to be displayed.

In some implementations, the apparatus 600 further includes a third determining module 606, configured to determine, before that the determining module 602 determines according to the indication information whether the current network meets the preset condition and determines according to the address whether the webpage to be displayed includes an image required to be displayed, and the first sending module 603 sends the static data resource corresponding to the image to the terminal, a preset image in each image on the webpage to be displayed and determine the preset image as the image required to be displayed.

In some implementations, the apparatus 600 further includes an annotation module 607, configured to annotate the image required to be displayed and/or the image not required to be displayed on the webpage to be displayed, so as to obtain the annotation information.

In some implementations, the apparatus 600 further includes a second sending module 608, configured to send the annotation information and an initial HTML of the webpage to be displayed to the terminal, so that the terminal modify, according to the annotation information, the SRC of the image (not required to be displayed) in the initial HTML to be null, or modify the SRC of the image not required to be displayed to a default image SRC of the terminal, to obtain the target HTML.

In some implementations, the apparatus 600 further includes a processing module 609 and a third sending module 610, where the processing module 609 is configured to obtain, when it is determined that the current network meets the preset condition according to the indication information and that the webpage to be displayed comprises an image required to be displayed according to the address, the initial HTML of the webpage to be displayed, modify the sparse representation classification (SRC) of the image not required to be displayed in the initial HTML to be null, or modify the SRC of the image not required to be displayed to a default image SRC of the terminal, to obtain the target HTML. The third sending module 610 is configured to send the target HTML to the terminal.

The apparatus for processing webpage provided in the present application may be used to execute the above method executed on the server side. Reference may be made to the method embodiments for the content and effect thereof, which will not be repeated herein.

Figure 7:
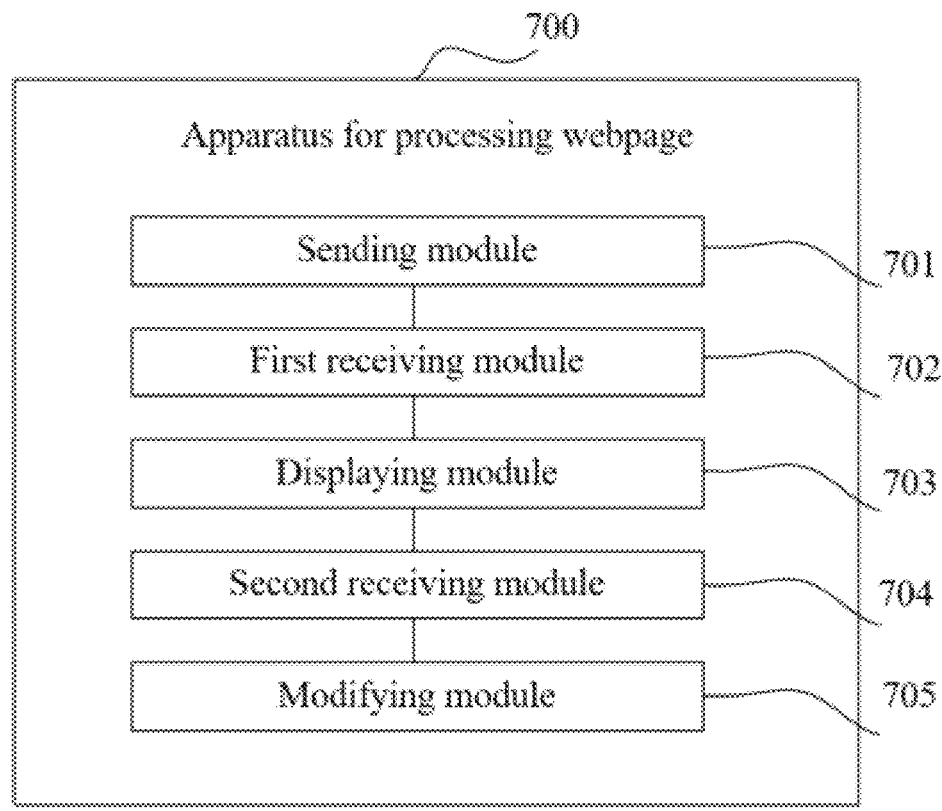
FIG. 7 is a schematic diagram of an apparatus for processing webpage 700 according to an embodiment of the present application.

FIG. 7 is a schematic diagram of an apparatus for processing webpage 700 according to an embodiment of the present application. As shown in FIG. 7, the apparatus 700 is part or entire of a terminal, where the apparatus 700 includes:

a sending module 701, configured to send a webpage request message to a server, where the webpage request message includes an address of a webpage to be displayed and indication information, the indication information is used to indicate whether a current network accessed by the terminal meets a preset condition, and the preset condition includes at least one of the following: the current network being a mobile network, a bandwidth of the current network being less than a preset bandwidth, and a rate of the current network being less than a preset rate;

a first receiving module 702, configured to receive a static data resource that is sent by the server and corresponds to the image required to be displayed; and a display module 703, configured to render, according to the static data resource and a target hypertext markup language (HTML) of the webpage to be displayed, the webpage to be displayed so as to display the webpage to be displayed.

In some implementations, the apparatus 700 further includes a second receiving module 704 and a modifying module 705, where the second receiving module 704 is configured to receive, before that the display module 703 renders the webpage to be displayed according to the static data resource and a target HTML of the webpage to be displayed so as to display the webpage to be displayed, annotation information and an initial HTML of the webpage to be displayed, where the annotation information is used to annotate the image required to be displayed and the image not required to be displayed on the webpage to be displayed.

The modifying module 705 is configured to modify, according to the annotation information, an sparse representation classification (SRC) of the image not required to be displayed in the initial HTML to be null in case that the current network meets the preset condition, or modify the SRC of the image not required to be displayed to a default image SRC of the terminal, to obtain the target HTML.

In some implementations, the target HTML is obtained, by the server, modifying the SRC of the image not required to be displayed in the initial HTML of the webpage to be displayed to be null, or modifying the SRC of the image not required to be displayed to a default image SRC of the terminal.

The apparatus for processing webpage provided in the present application may be used to execute the above method executed on the terminal side. Reference may be made to the method embodiments for the content and effect thereof, which will not be repeated herein.

The present application further provides, according to the embodiments of the present application, an electronic device and computer-readable storage medium.

Figure 8:
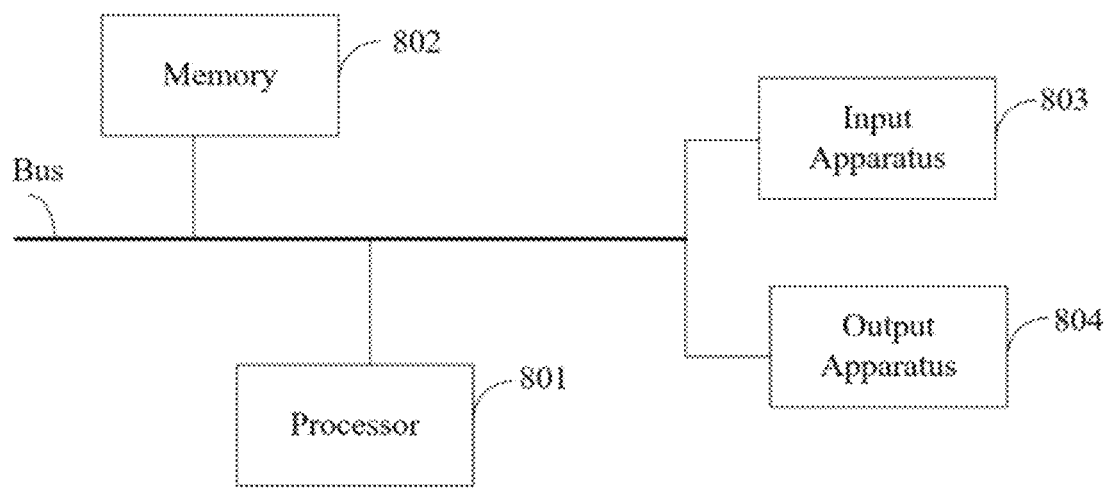
FIG. 8 is a schematic diagram of an electronic device according to an embodiment of the present application.

FIG. 8 is a schematic diagram of an electronic device according to an embodiment of the present application. As shown in FIG. 8, the electronic device is designed to represent various forms of digital computers, such as a laptop computer, a desktop computer, a work station, a personal digital assistant, a server, a blade server, a mainframe computer, and other suitable computer. The electronic devices may also represent various forms of mobile device, such as a personal digital assistant, a cellular phone, a smart phone, a wearable device, and other similar computing apparatus. The components thereof, the connections and the relationships therebetween, and the functions thereof shown herein are only examples and are not intended to limit the implementation of the present application described and/or required herein.

As shown in FIG. 8, the electronic device includes one or more processors 801, a memory 802, and interfaces for connecting various components which include a high-speed interface and a low-speed interface. The various components are interconnected via different buses and may be installed on a common motherboard or otherwise installed as required. The processor may process instructions executed within the electronic device, and the instructions includes instructions stored in the memory or on the memory to display graphical information of the GUI on an external input/output apparatus such as a display device coupled to the interfaces. In other embodiments, multiple processors and/or multiple buses may be used together with multiple memories and multiple memories, if desired. Similarly, multiple electronic devices may be connected, where each electronic device provides some of the necessary operations (for example, as a server array, a group of blade servers, or a multi-processor system). One processor 801 is taken as an example in FIG. 8.

The memory 802 is a computer-readable non-transitory storage medium provided by the present application, and it stores instructions executable by at least one processor to cause the at least one processor to execute the method for processing webpage provided in the present application. The computer-readable non-transitory storage medium of the present application stores computer instructions, which are configured to cause a computer to execute the method for processing webpage provided by the present application.

The memory 802 is a computer-readable non-transitory storage medium and may be configured to store non-transitory software programs, non-transitory computer executable programs, and modules, such as program instructions/modules (for example, each module shown in FIG. 7 and each module shown in FIG. 8) corresponding to the methods for processing webpage in the embodiments of the present application. The processor 801 implements the method for processing webpage in the above method embodiments by running non-transitory software programs, instructions, and modules stored in the memory 802.

The memory 802 may include a program storage area and a data storage area, where the program storage area may store an operating system and an application program required for at least one function; the data storage area may store data created according to the use of an electronic device for processing webpage. In addition, the memory 802 may include a high-speed random access memory, and may also include a non-transitory memory, such as at least one magnetic disk storage device, a flash memory device, or other non-transitory solid-state storage device. In some embodiments, the memory 802 may in some implementations include a memory disposed remotely with respect to the processor 801, and these remote memories may be connected to the electronic device for webpage processing through a network. Examples of the above network include, but are not limited to, the Internet, an intranet, a local area network, a mobile communication network and combinations thereof.

The electronic device for the method for processing webpage may further include an input apparatus 803 and an output apparatus 804. The processor 801, the memory 802, the input apparatus 803 and the output apparatus 804 may be connected through a bus or in other manners. In FIG. 8, the bus-based connection is taken as an example.

The input apparatus 803 may receive inputted numeric or character information, and generate key signal inputs related to user settings and function control of electronic devices for processing webpage, and may include an input apparatus such as a touch screen, a keypad, a mouse, a track pad, a touchpad, a pointing stick, one or multiple mouse buttons, a trackball, a joystick and the like. The output apparatus 804 may include a display device, an auxiliary lighting apparatus (for example, an LED), a haptic feedback apparatus (for example, a vibration motor) and the like. The display device may include, but is not limited to, a liquid crystal display (LCD), a light emitting diode (LED) display, and a plasma display. In some embodiments, the display device may be a touch screen.

Various implementations of the systems and technologies described herein may be implemented in digital electronic circuitry systems, integrated circuit systems, application specific integrated circuits (ASICs), computer hardware, firmware, software, and/or combinations thereof. The various implementations may include: being implemented in one or more computer programs, where the one or more computer programs are executable and/or interpretable on a programmable system including at least one programmable processor, the programmable processor may be a dedicated or general programmable processor that may receive data and instructions from a storage system, at least one input apparatus, and at least one output apparatus, and transmit the data and instructions to the storage system, the at least one input apparatus, and the at least one output apparatus.

The computing programs (also known as programs, software, software applications, or code) include machine instructions of a programmable processor, and such computing programs may be implemented by using high-level processes and/or object-oriented programming languages, and/or assembly/machine languages. As used herein, terms "machine-readable medium" and "computer-readable medium" refer to any computer program product, device, and/or apparatus (such as magnetic disks, optical disks, memories, programmable logic devices (PLDs)) used to provide machine instructions and/or data to a programmable processor, and includes machine-readable medium that receive machine instructions used as machine-readable signals. The term "machine-readable signal" refers to any signal used to provide machine instructions and/or data to a programmable processor.

To provide interaction with users, the systems and techniques described herein may be implemented on a computer, including: a display device for displaying information to the user, for example, a cathode ray tube (CRT) or an liquid crystal display (LCD) monitor; and a keyboard and pointing apparatus (e.g., a mouse or a trackball) through which the user may provide the input to a computer. Other kinds of apparatuses may also be used to provide interaction with the user; for example, the feedback provided to the user may be any form of sensory feedback (e.g., visual feedback, auditory feedback, or haptic feedback); and may receive input from the user in any form (including acoustic input, voice input, or tactile input).

The systems and technologies described herein may be implemented in a computing system that includes back-end components (for example, as a data server), or a computing system that includes middleware components (for example, an application server), or a computing system that includes front-end components (for example, a user computer with a graphical user interface or web browser, through which the user may interact with the implementation of the systems and technologies described herein), or a computing system that includes any combination of the back-end components, middleware components, or front-end components. The components of the system may be interconnected by any form or medium of digital data communication (e.g., a communication network). Examples of communication networks include: local area network (LAN), wide area network (WAN), and the Internet.

The computer system may include both a client and a server. The client and the server are generally far away from each other and typically interact over a communication network. The client-server relationship is generated by running computer programs having a client-server relationship with each other on the respective computers.

The electronic device provided in the present application may be used to execute the above method for processing webpage. Reference may be made to the method embodiments for the content and effect thereof, which will not be repeated herein.

It should be understood that the various forms of processes shown above may be used to reorder, add, or delete steps. For example, the steps described in the present application may be performed in parallel, sequentially, or in different orders, as long as the desired results of the technical solutions disclosed in the present application may be achieved, which will not be limited herein.

The above specific implementation forms shall not constitute a limitation on the scope of protection of the present application. It should be understood by those skilled in the art that various modifications, combinations, sub-combinations and substitutions may be made according to design requirements and other factors. Any modification, equivalent replacement and improvement made within the spirit and principle of the present application shall be included in the scope of protection of the present application.

What is claimed is:

1. A method for processing webpage, comprising:
receiving a webpage request message sent by a terminal, wherein the webpage request message comprises an address of a webpage to be displayed and indication information, the indication information is used to indicate whether a current network accessed by the terminal meets a preset condition, and the preset condition comprises at least one of the following: the current network being a mobile network, a bandwidth of the current network being less than a preset bandwidth, and a rate of the current network being less than a preset rate; and sending, when it is determined that the current network meets the preset condition according to the indication information and that the webpage to be displayed comprises an image required to be displayed according to the address, a static data resource corresponding to the image to the terminal, so that the terminal is render-able to the webpage to be displayed according to the static data resource and a target hypertext markup language (HTML) of the webpage to be displayed, so as to display the webpage to be displayed;

wherein before the sending, when it is determined that the current network meets the preset condition according to the indication information and that the webpage to be displayed comprises an image required to be displayed according to the address, a static data resource corresponding to the image to the terminal, the method further comprises:

taking the webpage to be displayed as input of a neural network model to determine the image required to be displayed, wherein the neural network model is trained through webpage samples, the trained neural network model takes a webpage as input and takes an image required to be displayed on the webpage as output; or determining resolutions of all images on the webpage to be displayed and determining an image with a resolution less than a preset resolution as the image required to be displayed.

2. The method of claim 1, further comprising:

annotating the image required to be displayed and/or an image not required to be displayed on the webpage to be displayed to obtain annotation information.

3. The method of claim 2, further comprising:

sending the annotation information and an initial HTML of the webpage to be displayed to the terminal, so that the terminal modify, according to the annotation information, a sparse representation classification (SRC) of the image not required to be displayed in the initial HTML to be null, or modify the SRC of the image not required to be displayed to a default image SRC of the terminal, to obtain the target HTML.

4. The method of claim 1, further comprising:

obtaining, when it is determined that the current network meets the preset condition according to the indication information and that the webpage to be displayed comprises an image required to be displayed according to the address, an initial HTML of the webpage to be displayed;

modifying the SRC of the image not required to be displayed in the initial HTML to be null, or modifying the SRC of the image not required to be displayed to a default image SRC of the terminal, to obtain the target HTML; and sending the target HTML to the terminal.

5. The method of claim 1, before the sending, when it is determined that the current network meets the preset condition according to the indication information and that the webpage to be displayed comprises an image required to be displayed according to the address, a static data resource corresponding to the image to the terminal, further comprising:

determining a preset image in each image on the webpage to be displayed; and determining the preset image as the image required to be displayed.

6. A method for processing webpage, comprising:

sending a webpage request message to a server, wherein the webpage request message comprises an address of a webpage to be displayed and indication information, the indication information is used to indicate whether a current network accessed by a terminal meets a preset condition, and the preset condition comprises at least one of the following: the current network being a mobile network, a bandwidth of the current network being less than a preset bandwidth, and a rate of the current network being less than a preset rate;

receiving a static data resource that corresponds to an image required to be displayed on a webpage to be displayed and is sent by the server; and rendering, according to the static data resource and a target hypertext markup language (HTML) of the webpage to be displayed, the webpage to be displayed so as to display the webpage to be displayed;

wherein the image required to be displayed is determined by the server in the following way:

taking the webpage to be displayed as input of a neural network model to determine the image required to be displayed, wherein the neural network model is trained through webpage samples, the trained neural network model takes a webpage as input and takes an image required to be displayed on the webpage as output; or determining resolutions of all images on the webpage to be displayed and determining an image with a resolution less than a preset resolution as the image required to be displayed.

7. The method of claim 6, before the rendering, according to the static data resource and a target HTML of the webpage to be displayed, the webpage to be displayed so as to display the webpage to be displayed, further comprising:

receiving annotation information sent by the server and an initial HTML of the webpage to be displayed, wherein the annotation information is used to indicate an image required to be displayed on the webpage to be displayed and/or an image not required to be displayed; and when the current network meeting the preset condition, modifying, according to the annotation information, an SRC of the image not required to be displayed to be null, or modifying the SRC of the image not required to be displayed to a default image SRC of the terminal, to obtain the target HTML.

8. The method of claim 6, wherein the target HTML is obtained by the server modifying the SRC of the image not required to be displayed in the initial HTML of the webpage to be displayed to be null, or modifying the SRC of the image not required to be displayed to a default image SRC of the terminal.

9. An electronic device, comprising:

at least one processor, and a memory in communication with the at least one processor; wherein, the memory stores instructions executable by the at least one processor, and the instructions are executed by the at least one processor to:

receive a webpage request message sent by a terminal, wherein the webpage request message comprises an address of a webpage to be displayed and indication information, the indication information is used to indicate whether a current network accessed by the terminal meets a preset condition, and the preset condition comprises at least one of the following: the current network being a mobile network, a bandwidth of the current network being less than a preset bandwidth, and a rate of the current network being less than a preset rate; and send, when it is determined that the current network meets the preset condition according to the indication information and that the webpage to be displayed comprises an image required to be displayed according to the address, a static data resource corresponding to the image to the terminal, so that the terminal is render-able to the webpage to be displayed according to the static data resource and a target hypertext markup language (HTML) of the webpage to be displayed, so as to display the webpage to be displayed;

before sending, when it is determined that the current network meets the preset condition according to the indication information and that the webpage to be displayed comprises an image required to be displayed according to the address, a static data resource corresponding to the image to the terminal, the instructions are executed by the at least one processor to:

take the webpage to be displayed as input of a neural network model to determine the image required to be displayed, wherein the neural network model is trained through webpage samples, the trained neural network model takes a webpage as input and takes an image required to be displayed on the webpage as output; or determine resolutions of all images on the webpage to be displayed and determine an image with a resolution less than a preset resolution as the image required to be displayed.

10. The electronic device of claim 9, wherein the instructions are executed by the at least one processor to:

annotate the image required to be displayed and/or an image not required to be displayed on the webpage to be displayed to obtain annotation information.

11. The electronic device of claim 10, wherein the instructions are executed by the at least one processor to:

send the annotation information and an initial HTML of the webpage to be displayed to the terminal, so that the terminal modify, according to the annotation information, a sparse representation classification (SRC) of the image not required to be displayed in the initial HTML to be null, or modify the SRC of the image not required to be displayed to a default image SRC of the terminal, to obtain the target HTML.

12. The electronic device of claim 9, wherein the instructions are executed by the at least one processor to:

obtain, when it is determined that the current network meets the preset condition according to the indication information and that the webpage to be displayed comprises an image required to be displayed according to the address, an initial HTML of the webpage to be displayed;

modify the SRC of the image not required to be displayed in the initial HTML to be null, or modify the SRC of the image not required to be displayed to a default image SRC of the terminal, to obtain the target HTML; and send the target HTML to the terminal.

13. The electronic device of claim 9, wherein the instructions are executed by the at least one processor to:

before the sending, when it is determined that the current network meets the preset condition according to the indication information and that the webpage to be displayed comprises an image required to be displayed according to the address, a static data resource corresponding to the image to the terminal, determine a preset image in each image on the webpage to be displayed; and determine the preset image as the image required to be displayed.

14. An electronic device, comprising:

at least one processor, and a memory in communication with the at least one processor; wherein the memory stores instructions executable by the at least one processor, and the instructions are executed by the at least one processor to execute the method according to claim 6.

15. A computer-readable non-transitory storage medium with computer instructions stored thereon, wherein the computer instructions are configured to cause a computer to execute the method according to claim 1.

16. A computer-readable non-transitory storage medium with computer instructions stored thereon, wherein the computer instructions are configured to cause a computer to execute the method according to claim 6.

* * * * *